US012810771B2

(12) United States Patent
Chen et al.

(10) Patent No.: US 12,810,771 B2
(45) Date of Patent: Nov. 24, 2026

(54) MULTISTABLE DISPLAY WITH HANDWRITING FUNCTION

(71) Applicant: GENETOUCH CORP., Taoyuan City (TW)

(72) Inventors: Cheng-Yu Chen, Taoyuan City (TW); Ching-Lung Li, Taoyuan City (TW); Chi Lee, Taoyuan City (TW)

(73) Assignee: GENETOUCH CORP. (TW)

( * ) Notice: Subject to any disclaimer, the term of this patent is extended or adjusted under 35 U.S.C. 154(b) by 11 days.

(21) Appl. No.: 19/321,035

(22) Filed: Sep. 5, 2025

(65) Prior Publication Data

US 2026/0301641 A1 Oct. 1, 2026

(30) Foreign Application Priority Data

Apr. 1, 2025 (TW) ................................ 114112628

(51) Int. Cl.

| | |
|---|---|
| ***G09G 3/20*** | (2006.01) |
| ***G06F 3/041*** | (2006.01) |
| ***G09G 3/36*** | (2006.01) |

(52) U.S. Cl.

CPC ......... *G09G 3/2096* (2013.01); *G06F 3/0412* (2013.01); *G06F 3/04166* (2019.05); *G09G 3/3692* (2013.01); *G09G 3/3629* (2013.01); *G09G 2300/0486* (2013.01); *G09G 2310/027* (2013.01); *G09G 2310/061* (2013.01); *G09G 2354/00* (2013.01)

(58) Field of Classification Search

CPC .. G09G 3/2096; G09G 3/3692; G09G 3/3629; G09G 2300/0486; G09G 2310/027; G09G 2310/061; G09G 2354/00; G06F 3/0412; G06F 3/04166; G06F 3/04

See application file for complete search history.

(56) References Cited

U.S. PATENT DOCUMENTS

| | | | | |
|---|---|---|---|---|
| 6,333,996 | B1 * | 12/2001 | Kato | G06F 3/04883 382/188 |
| 9,741,085 | B2 * | 8/2017 | Avni | G06T 1/0028 |
| 2020/0326840 | A1 * | 10/2020 | Kasatani | G06V 40/382 |

* cited by examiner

*Primary Examiner* — Chanh D Nguyen
*Assistant Examiner* — Jarurat Suteerawongsa
(74) *Attorney, Agent, or Firm* — NOD Law PC

(57) ABSTRACT

A multistable display with a handwriting function includes a timing controller circuit unit, a driver circuit unit, and a display panel unit. When the driver circuit unit receives a digital to analog (d2a) signal, the driver circuit unit generates a pixel electrode driver signal outputted to the display panel unit according to a handwriting pixel electrode header setting data and a handwriting pixel electrode waveform data. The driver circuit unit can use the handwriting pixel electrode waveform data with fewer bits, in conjunction with the handwriting pixel electrode header setting data, to determine a voltage value of the pixel electrode driver signal outputted to the display panel unit. Namely, the timing controller circuit unit can transmit voltage data without 3-bit binary code. Therefore, an amount of transmission data can be decreased for reducing data transmission time and improving data transmission efficiency.

10 Claims, 7 Drawing Sheets

MULTISTABLE DISPLAY WITH HANDWRITING FUNCTION

CROSS-REFERENCE TO RELATED APPLICATION(S)

This application claims the priority benefit of TW application No. 114112628 filed on Apr. 1, 2025, the entirety of which is hereby incorporated by reference herein and made a part of the specification.

BACKGROUND OF THE INVENTION

1. Field of the Invention

The present invention relates to a display, more particularly a multistable display with a handwriting function.

2. Description of the Related Art

A conventional multistable display, such as a cholesteric liquid crystal display (ChLCD), has liquid crystals with bistable displaying properties. As such, various sets of different voltages are required to drive the conventional multistable display for displaying a frame. For example, the conventional multistable display includes a display panel unit, and each pixel on the display panel unit is intersected by each of multiple line electrodes and each of multiple pixel electrodes. Furthermore, in the display panel unit, a liquid crystal layer is mounted between the line electrodes and the pixel electrodes. When driving the display panel unit, voltages are applied to the line electrodes and the pixel electrodes, thus configuring a location corresponding to a pixel to have a specific voltage difference across the liquid crystal layer, and allowing the liquid crystal within the liquid crystal layer to correspondingly rotate to a specific angle.

The conventional multistable display further includes a timing controller circuit unit (TCON) and a driver circuit unit (driver IC). The timing controller circuit unit is configured to generate a timing controller signal to the driver circuit unit. The driver circuit unit is configured to generate pixel driving signals to the line electrodes and the pixel electrodes according to the timing controller signal, thus driving the conventional multistable display to display a frame.

The timing controller circuit unit, conventionally, includes a clock (clk) signal output port, a display output enable (doe) control port, a display output ground (dog) control port, a digital to analog (d2a) control port, a display start pulse (dsp) control port, a plurality of data output ports (data 0 to data n), and a plurality of scan output ports (scan 0 to scan m). The clk signal output port, the doe control port, the dog control port, the d2a control port, the dsp control port, the data output ports (data 0 to data n), and the scan output ports (scan 0 to scan m) are connected to the driver circuit unit for transporting the timing controller signal.

As various sets of different voltages are required to drive the conventional multistable display, a timing controller signal of the conventional multistable display, however, requires a plurality of bits to transport control data that dictates the various sets of different voltages required for each of the pixels. In other words, the control signal of the conventional multistable display cannot simply use one single bit to represent the various sets of different voltages required for each of the pixels. For example, conventionally, the control data used for dictating the various sets of different voltages required for each of the pixels is transported in 3 bits. This means that, each time the various sets of different voltages required for one pixel are modified, 3 bits of the control data need to be transported.

For example, with reference to FIGS. 7A and 7B, the timing controller circuit unit includes 3 data output ports (data 0 to data 2), and 3 scan output ports (scan 0 to scan 2). For a multistable display with a resolution of 4×4, the 3 data output ports (data 0 to data 2) output a data signal 11*a* to the driver circuit unit, and the data signal 11*a* includes 4 pixel electrode data (pixel 1 to pixel 4). The driver circuit unit generates 4 pixel electrode driver signals according to the 4 pixel electrode data (pixel 1 to pixel 4), and transports the 4 pixel electrode driver signals to the 4 pixel electrodes. The 3 scan output ports (scan 0 to scan 2) output a scan signal 12*a* to the driver circuit unit, and the scan signal 12*a* includes 4 line electrode data (line 1 to line 4). The driver circuit unit generates 4 line electrode driver signals according to the 4 line electrode data (line 1 to line 4), and transports the 4 line electrode driver signals to the 4 line electrodes.

In a handwriting mode, the pixel electrode data corresponding to each of the pixels is transported in 3 bits, and the line electrode data corresponding to each of the pixels is also transported in 3 bits. For example, a first pixel electrode data (pixel 1) is transported in 3 bits, such as pixel 1 (0) to pixel 1 (2). With reference to FIG. 7A, since the timing controller circuit unit includes 3 data output ports (data 0 to data 2) and 3 scan output ports (scan 0 to scan 2), the timing controller circuit unit only can transport 1 pixel electrode data each time, and only can transport 1 line electrode data each time. Therefore, 4 pixel electrode data (pixel 1 to pixel 4) needs to be transported in 4 times. Similarly, 4 line electrode data (line 1 to line 4) also needs to be transported in 4 times.

As described earlier, when the timing controller circuit unit outputs the pixel electrode data and the line electrode data to the driver circuit unit, the pixel electrode data and the line electrode data need to be transported in multiple times. Hence, the conventional multistable display consumes too much time, resulting in low data transmission efficiency.

SUMMARY OF THE INVENTION

As most conventional multistable displays consume too much time resulting in low data transmission efficiency, the present invention provides a multistable display with a handwriting function to reduce the amount of transmission data in handwriting mode, thereby improving data-transmission efficiency.

The multistable display includes a timing controller circuit unit (TCON), a driver circuit unit (Driver IC), and a display panel unit (Panel).

The timing controller circuit unit generates a timing controller signal. The driver circuit unit is connected to the timing controller circuit unit, and receives the timing controller signal. The display panel unit is connected to the driver circuit unit.

The timing controller signal includes a digital to analog (d2a) signal, a data signal, and a scan signal. The data signal includes a handwriting pixel electrode header setting data and a handwriting pixel electrode waveform data. The scan signal includes a handwriting line electrode header setting data and a handwriting line electrode waveform data.

When the driver circuit unit receives the d2a signal, the driver circuit unit generates at least one pixel electrode driver signal outputted to the display panel unit according to the handwriting pixel electrode header setting data and the handwriting pixel electrode waveform data, and the driver circuit unit generates at least one line electrode driver signal outputted to the display panel unit according to the handwriting line electrode header setting data and the handwriting line electrode waveform data.

Since when the driver circuit unit receives the d2a signal, the driver circuit unit generates the at least one pixel electrode driver signal outputted to the display panel unit according to the handwriting pixel electrode header setting data and the handwriting pixel electrode waveform data, the driver circuit unit can determine a voltage value of the at least one pixel electrode driver signal outputted to the display panel unit according to the handwriting pixel electrode waveform data with fewer bits, in conjunction with the handwriting pixel electrode header setting data. Namely, the driver circuit unit does not need to directly transmit 3 bits of voltage data to the display panel unit. Similarly, since the driver circuit unit generates the at least one line electrode driver signal outputted to the display panel unit according to the handwriting line electrode header setting data and the handwriting line electrode waveform data, the driver circuit unit can also determine a voltage value of the at least one line electrode driver signal outputted to the display panel unit according to the handwriting line electrode waveform data with fewer bits, in conjunction with the handwriting line electrode header setting data. Namely, the driver circuit unit also does not need to directly transmit 3 bits of voltage data to the display panel unit. Therefore, the multistable display with the handwriting function of the present invention can use fewer bits to complete data transmission, and the amount of transmission data can be decreased for reducing data transmission time and for improving the data transmission efficiency.

DETAILED DESCRIPTION OF THE INVENTION

Figure 1:
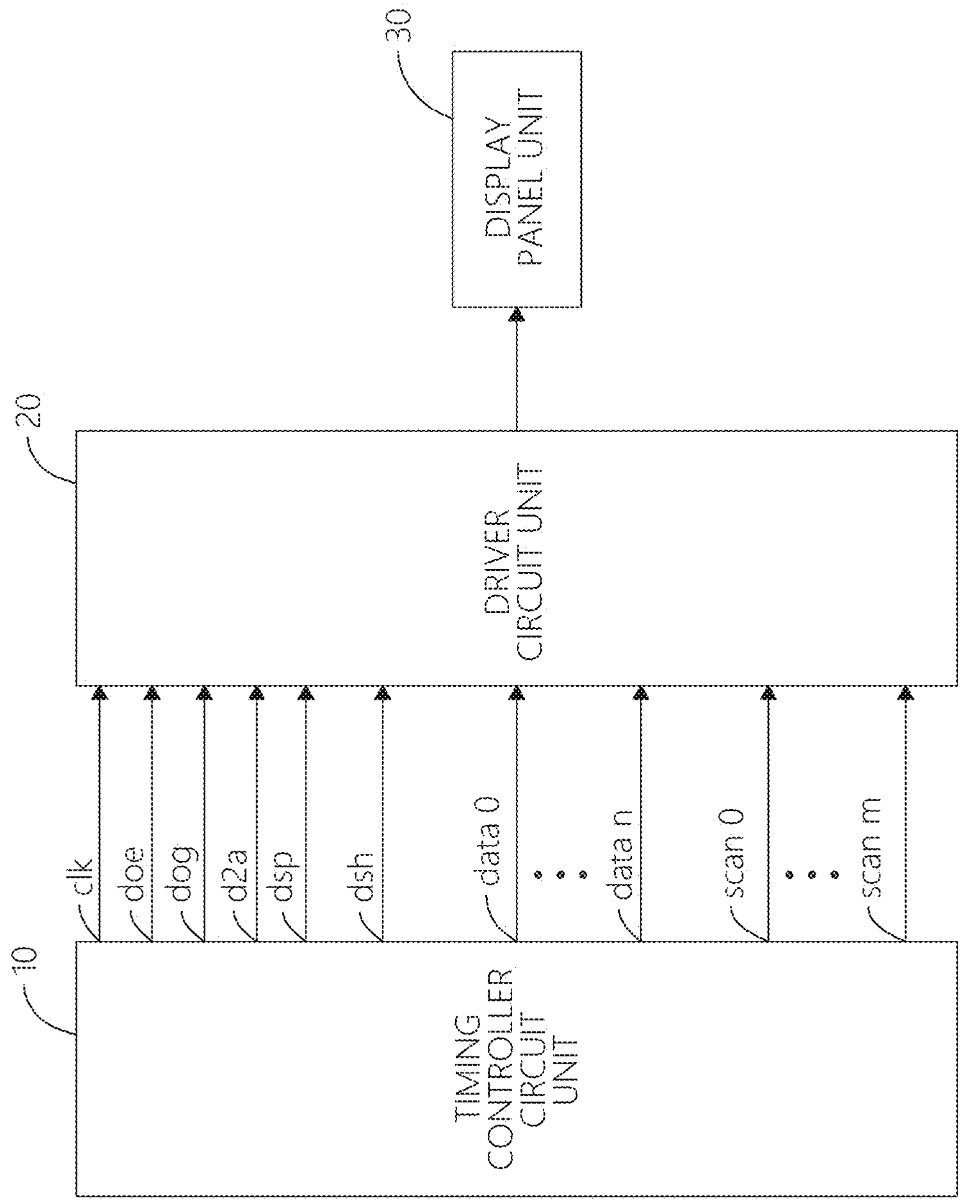
FIG. 1 is a block diagram of a multistable display with a handwriting function of the present invention.

With reference to FIG. 1, a multistable display includes a timing controller circuit unit 10, a driver circuit unit 20, and a display panel unit 30.

The timing controller circuit unit 10 generates a timing controller signal. The driver circuit unit 20 is connected to the timing controller circuit unit 10, and receives the timing controller signal. The display panel unit 30 is connected to the driver circuit unit 20.

In one embodiment, the timing controller circuit unit 10 includes a clock (clk) signal output port, a display output enable (doe) control port, a display output ground (dog) control port, and a display start pulse (dsp) control port. The clk signal output port, the doe control port, the dog control port, and the dsp control port of the timing controller circuit unit 10 are functionally identical with those on a timing controller circuit unit of a conventional multistable display described in the prior art, and thus further detailed description is omitted. The timing controller circuit unit 10 further includes multiple data output ports, such as a first data output port to a $(n+1)^{th}$ data output port (data 0 to data n), and includes multiple scan output ports, such as a first scan output port to a $(m+1)^{th}$ scan output port (scan 0 to scan m).

Figure 2:
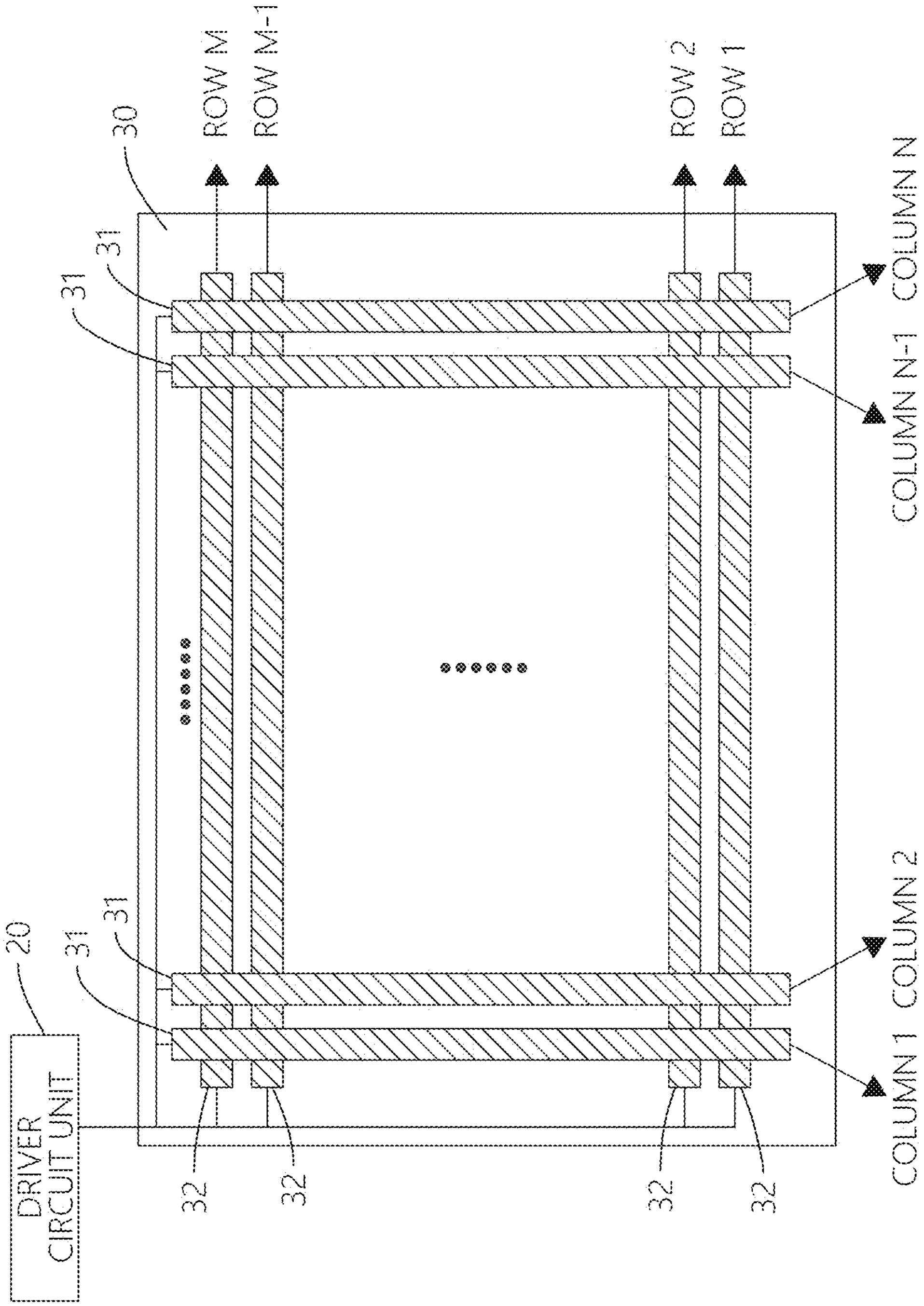
FIG. 2 is a schematic view of a panel structure of the multistable display with the handwriting function of the present invention.

With reference to FIG. 2, the display panel unit 30 includes a plurality of pixel electrode 31 and a plurality of line electrodes 32. Each pixel on the display panel unit 30 is intersected by each of the pixel electrodes 31 and each of the line electrodes 32.

Figures 3A, 3B, 3C:
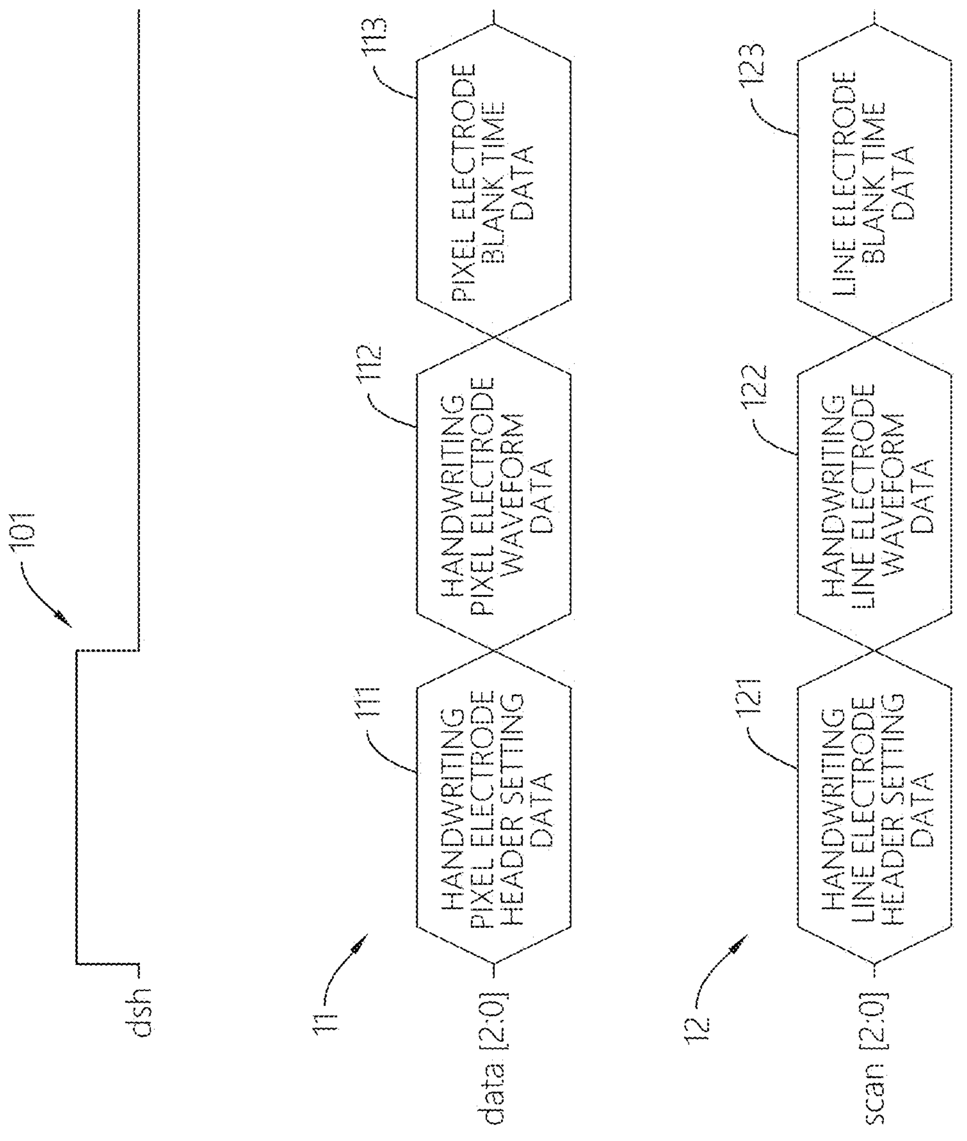
FIG. 3A is a waveform schematic view of a header setting signal of the multistable display with the handwriting function of the present invention.
FIG. 3B is a schematic view of a data signal of the multistable display with the handwriting function of the present invention.
FIG. 3C is a schematic view of a scan signal of the multistable display with the handwriting function of the present invention.

With reference to FIGS. 3A to 3C, the timing controller signal includes a digital to analog (d2a) signal, a data signal 11, and a scan signal 12. The data signal 11 includes a handwriting pixel electrode header setting data 111 and a handwriting pixel electrode waveform data 112. The scan signal 12 includes a handwriting line electrode header setting data 121 and a handwriting line electrode waveform data 122. In the embodiment, the timing controller circuit unit 10 further includes a d2a control port. The d2a control port is connected to the driver circuit unit 20, and outputs the d2a signal to the driver circuit unit 20.

When the driver circuit unit 20 receives the d2a signal, the driver circuit unit 20 generates at least one pixel electrode driver signal outputted to the display panel unit 30 according to the handwriting pixel electrode header setting data 111 and the handwriting pixel electrode waveform data 112, and the driver circuit unit 20 generates at least one line electrode driver signal outputted to the display panel unit 30 according to the handwriting line electrode header setting data 121 and the handwriting line electrode waveform data 122.

Since when the driver circuit unit 20 receives the d2a signal, the driver circuit unit 20 generates the at least one pixel electrode driver signal outputted to the display panel unit 30 according to the handwriting pixel electrode header setting data 111 and the handwriting pixel electrode waveform data 112, the driver circuit unit 20 can determine a voltage value of the at least one pixel electrode driver signal outputted to the display panel unit 30 according to the handwriting pixel electrode waveform data 112 with fewer bits, in conjunction with the handwriting pixel electrode header setting data 111. Namely, the driver circuit unit 20 does not need to directly transmit 3 bits of voltage data to the display panel unit 30. Similarly, since the driver circuit unit 20 generates the at least one line electrode driver signal outputted to the display panel unit 30 according to the handwriting line electrode header setting data 121 and the handwriting line electrode waveform data 122, the driver circuit unit 20 can also determine a voltage value of the at least one line electrode driver signal outputted to the display panel unit 30 according to the handwriting line electrode waveform data 122 with fewer bits, in conjunction with the handwriting line electrode header setting data 121. Namely, the driver circuit unit 20 also does not need to directly transmit 3 bits of voltage data to the display panel unit 30. Therefore, the multistable display with the handwriting function of the present invention can use fewer bits to complete data transmission, and the amount of transmission data can be decreased for reducing data transmission time and for improving the data transmission efficiency.

In the embodiment, the handwriting pixel electrode waveform data 112 of the data signal 11 is a 1-bit binary code, and the handwriting line electrode waveform data 122 of the scan signal 12 is also a 1-bit binary code.

Moreover, the timing controller circuit unit 10 may include a display setting header (dsh) control port. The dsh control port is connected to the driver circuit unit 20, and outputs a header setting signal 101 to the driver circuit unit 20. The data output ports (data 0 to data n) are connected to the driver circuit unit 20, and output the data signal 11 to the driver circuit unit 20. When the data signal 11 outputted by the data output ports (data 0 to data n) is the pixel electrode header setting data 111, the dsh control port outputs the header setting signal 101 at a high voltage; otherwise, the dsh control port outputs the header setting signal 101 at a low voltage.

Similarly, the scan output ports (scan 0 to scan n) are connected to the driver circuit unit 20, and output the scan signal 12 to the driver circuit unit 20. When the scan signal 12 outputted by the scan output ports (scan 0 to scan n) is the line electrode header setting data 121, the dsh control port outputs the header setting signal 101 at the high voltage; otherwise, the dsh control port outputs the header setting signal 101 at the low voltage.

Preferably, the data output ports (data 0 to data n) and the scan output ports (scan 0 to scan m) simultaneously output the handwriting pixel electrode header setting data 111 and the handwriting line electrode header setting data 121.

Further, the data signal 11 includes a pixel electrode blank time data 113, and the pixel electrode blank time data 113 is configured after the handwriting pixel electrode waveform data 112. The scan signal 12 further includes a line electrode blank time data 123, and the line electrode blank time data 123 is configured after the handwriting line electrode waveform data 122.

Figure 4A:
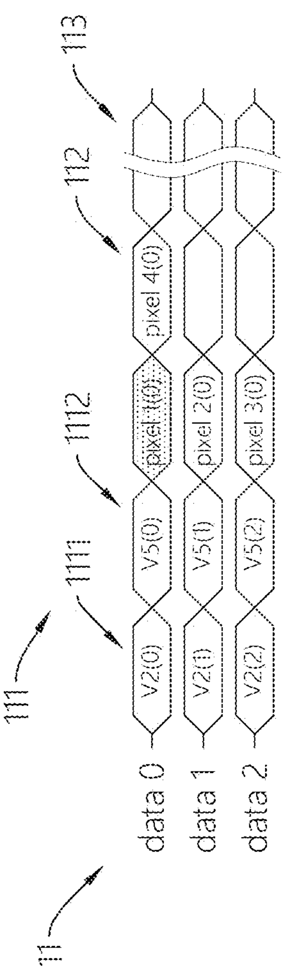
FIG. 4A is a schematic view of the data signal of the multistable display with the handwriting function of the present invention.
Figure 4B:
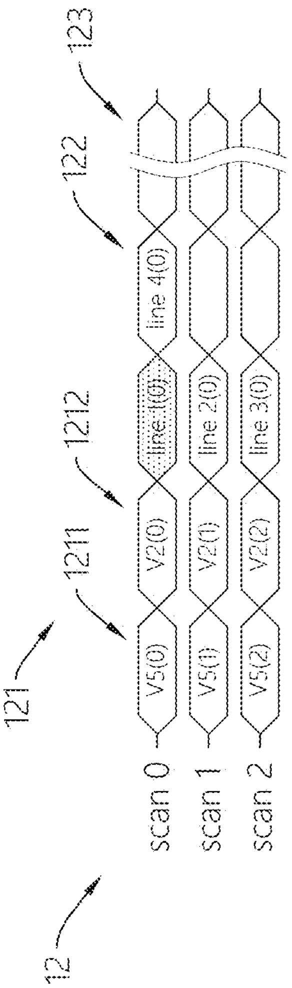
FIG. 4B is a schematic view of the scan signal of the multistable display with the handwriting function of the present invention.
Figure 5:
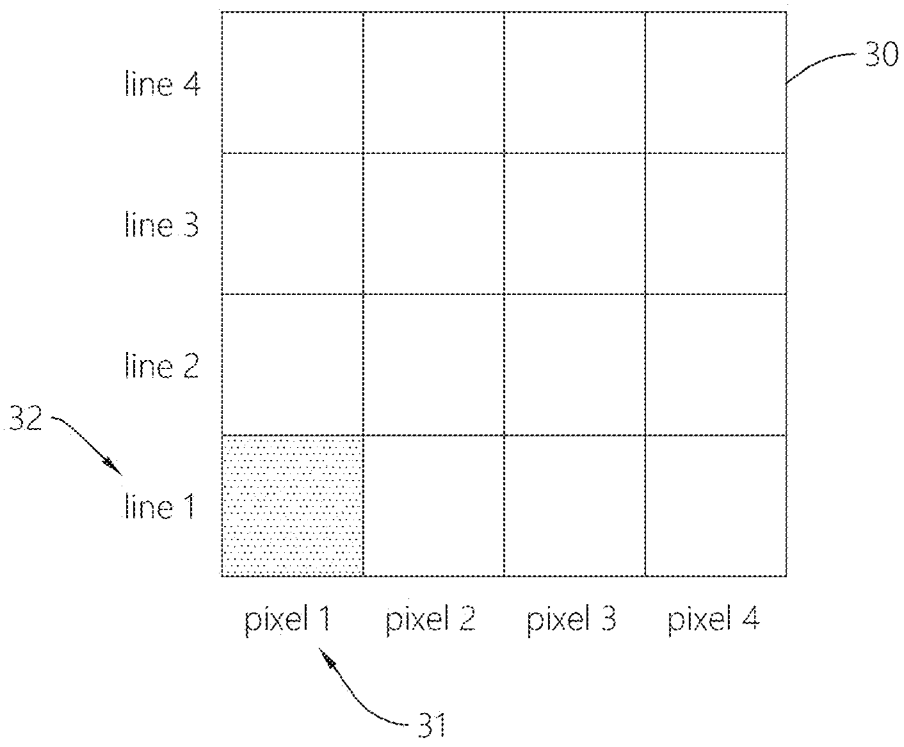
FIG. 5 is a schematic view of a display state of the multistable display with the handwriting function of the present invention.

For example, with reference to FIGS. 4A and 4B, the timing controller circuit unit 10 includes 3 data output ports (data 0 to data 2) and 3 scan output ports (scan 0 to scan 2). With reference to FIG. 5, for a multistable display with a resolution of 4×4, the 3 data output ports (data 0 to data 2) output 4 pixel electrode data (pixel 1 to pixel 4) to the driver circuit unit 20. The driver circuit unit 20 generates 4 pixel electrode driver signals according to the 4 pixel electrode data (pixel 1 to pixel 4), and transports the 4 pixel electrode driver signals to the 4 pixel electrodes. The 3 scan output ports (scan 0 to scan 2) output 4 line electrode data (line 1 to line 4) to the driver circuit unit 20. The driver circuit unit 20 generates 4 line electrode driver signals according to the 4 line electrode data (line 1 to line 4), and transports the 4 line electrode driver signals to the 4 line electrodes.

Moreover, the handwriting pixel electrode header setting data 111 of the data signal 11 includes a first pixel electrode voltage data 1111 and a second pixel electrode voltage data 1112. For example, the first pixel electrode voltage data 1111 outputted by the 3 data output ports (data 0 to data 2) is presented in 3-bit binary codes, respectively as V2(0) to V2(2), for corresponding to a second voltage V2. The second pixel electrode voltage data 1112 outputted by the 3 data output ports (data 0 to data 2) is also presented in 3-bit binary codes, respectively as V5(0) to V5(2), for corresponding to a fifth voltage V5.

The handwriting line electrode header setting data 121 of the scan signal 12 includes a first line electrode voltage data 1211 and a second line electrode voltage data 1212. For example, the first line electrode voltage data 1211 outputted by the 3 scan output ports (scan 0 to scan 2) is presented in 3-bit binary codes, respectively as V5(0) to V5(2), for corresponding to the fifth voltage V5. The second line electrode voltage data 1212 outputted by the 3 scan output ports (scan 0 to scan 2) is also presented in 3-bit binary codes, respectively as V2(0) to V2(2), for corresponding to the second voltage V2.

Furthermore, the handwriting pixel electrode waveform data 112 of the data signal 11 is a 1-bit binary code, and the handwriting line electrode waveform data 122 of the scan signal 12 is also a 1-bit binary code. In a handwriting mode, a handwriting input means at least one track displayed on the display panel unit 30, the at least one track may be at least one position of the display panel unit 30, and the track is usually displayed by a single color. For example, as shown in FIG. 5, when a user performs the handwriting input at a bottom left position of the display panel unit 30, the display panel unit 30 displays a color on a pixel of the display panel unit 30 corresponding to the bottom left position, and other pixels of the display panel unit 30 are colorless. In this example, the pixel of the display panel unit 30 corresponding to the bottom left position is intersected by the first pixel electrode 31 (pixel 1) and the first line electrode 32 (line 1).

Therefore, the handwriting pixel electrode waveform data 112 corresponding to the first pixel electrode 31 (pixel 1) and the handwriting line electrode waveform data 122 corresponding to the first line electrode 32 (line 1) are respectively set as a first digital value, such as digital "1". Further, the handwriting pixel electrode waveform data 112 corresponding to the pixel electrodes 31 other than the first pixel electrode 31 (pixel 1) and the handwriting line electrode waveform data 122 corresponding to the line electrodes 32 other than the first line electrode 32 (line 1) are respectively set as a second digital value, such as digital "0". For example, as shown in FIG. 4A, pixel 1 (0) is the handwriting pixel electrode waveform data 112 corresponding to the first pixel electrode 31 (pixel 1), and is set as digital "1". As shown in FIG. 4B, line 1 (0) is the handwriting line electrode waveform data 122 corresponding to the first line electrode 32 (line 1), and is set as digital "1". Namely, the handwriting input is on the pixel intersected by the first pixel electrode 31 (pixel 1) and the first line electrode 32 (line 1), and the display panel unit 30 displays the color on the pixel intersected by the first pixel electrode 31 (pixel 1) and the first line electrode 32 (line 1). On the other hand, the pixel 2-4 (0) is the handwriting pixel electrode waveform data 112 corresponding to the second to fourth pixel electrodes 31 (pixel 2 to pixel 4), and is set as digital "0". The line 2-4 (0) is the handwriting line electrode waveform data 122 corresponding to the second to fourth line electrodes 32 (line 2 to line 4), and is set as digital "0". Therefore, the pixels intersected by the second to fourth pixel electrodes 31 (pixel 2 to pixel 4) and the second to fourth line electrodes 32 (line 2 to line 4) are colorless.

Figure 6A:
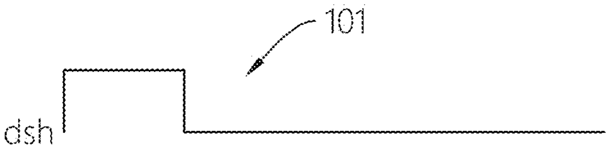
FIG. 6A is a waveform schematic view of the header setting signal of the multistable display of the present invention.
Figure 6B:
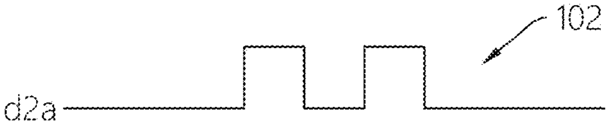
FIG. 6B is a waveform schematic view of a d2a signal of the multistable display of the present invention.
Figure 6C:
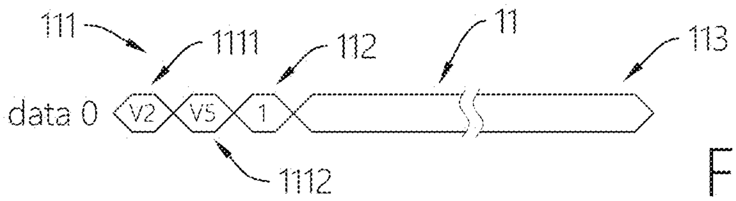
FIG. 6C is a schematic view of the data signal of the multistable display with the handwriting function of the present invention.
Figure 6D:
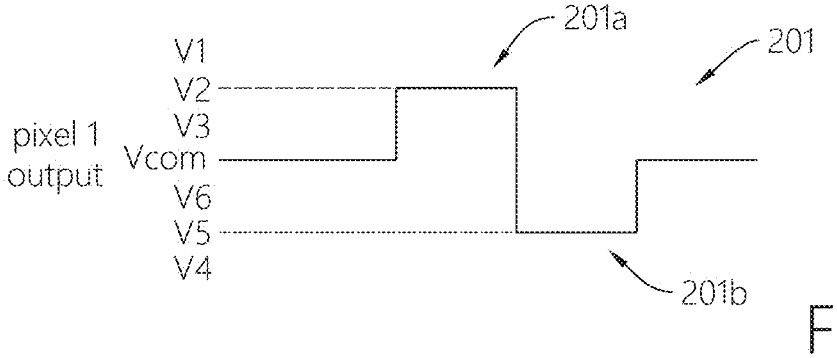
FIG. 6D is a waveform schematic view of a pixel electrode driver signal of the multistable display of the present invention.

Further with reference to FIGS. 6A to 6F, as shown in FIG. 6D, the pixel electrode driver signal 201 includes a first pixel electrode half period 201*a* and a second pixel electrode half period 201*b*.

As shown in FIGS. 6B and 6D, when the driver circuit unit 20 receives a first d2a signal 102, the pixel electrode driver signal 201 outputted by the driver circuit unit 20 is the first pixel electrode half period 201*a*. When the driver circuit unit 20 receives a second d2a signal 102, the pixel electrode driver signal 201 outputted by the driver circuit unit 20 is the second pixel electrode half period 201*b*.

Moreover, as shown in FIGS. 6C and 6D, the handwriting pixel electrode header setting data 111 of the data signal 11 includes the first pixel electrode voltage data 1111 and the second pixel electrode voltage data 1112. When the handwriting pixel electrode waveform data 112 of the data signal 11 is the first digital value, such as digital "1", the first pixel electrode half period 201*a* of the pixel electrode driver signal 201 is generated according to the first pixel electrode voltage data 1111 of the handwriting pixel electrode header setting data 111 by the driver circuit unit 20. In the embodiment, when the pixel electrode driver signal 201 outputted by the driver circuit unit 20 is the first pixel electrode half period 201*a*, a voltage value of the pixel electrode driver signal 201 generated by the driver circuit unit 20 is the second voltage V2 configured in the first pixel electrode voltage data 1111.

When the handwriting pixel electrode waveform data 112 of the data signal 11 is the first digital value, such as digital "1", the second pixel electrode half period 201*b* of the pixel electrode driver signal 201 is generated according to the second pixel electrode voltage data 1112 of the handwriting pixel electrode header setting data 111 by the driver circuit unit 20. In the embodiment, when the pixel electrode driver signal 201 outputted by the driver circuit unit 20 is the second pixel electrode half period 201*b*, the voltage value of the pixel electrode driver signal 201 generated by the driver circuit unit 20 is the fifth voltage V5 configured in the second pixel electrode voltage data 1112.

Figure 6E:
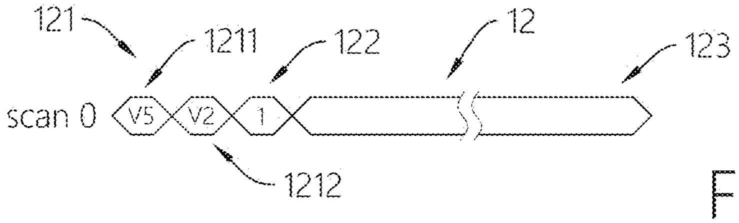
FIG. 6E is a schematic view of the scan signal of the multistable display with the handwriting function of the present invention.
Figure 6F:
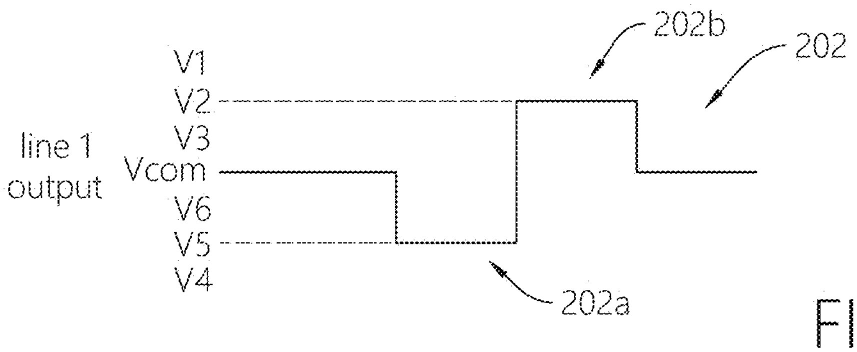
FIG. 6F is a waveform schematic view of a line electrode driver signal of the multistable display of the present invention.
Figure 7A:
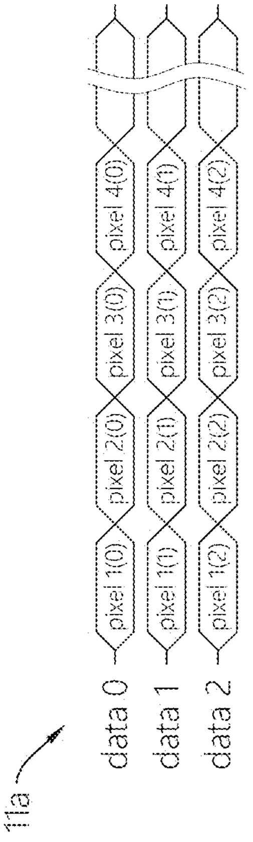
FIG. 7A is a schematic view of a data signal of a conventional multistable display.
Figure 7B:
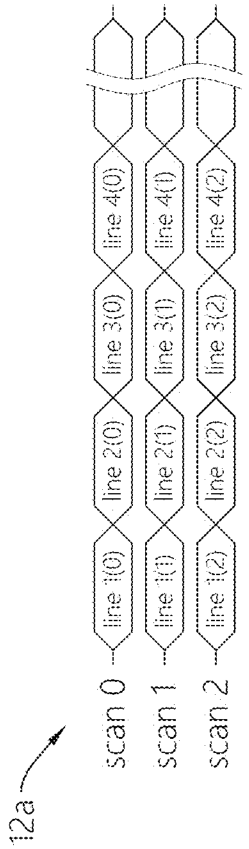
FIG. 7B is a schematic view of a scan signal of the conventional multistable display.

Furthermore, with reference to FIG. 6F, the line electrode driver signal 202 includes a first line electrode half period 202*a* and a second line electrode half period 202*b*.

As shown in FIGS. 6B and 6F, when the driver circuit unit 20 receives the first d2a signal 102, the line electrode driver signal 202 outputted by the driver circuit unit 20 is the first line electrode half period 202*a*. When the driver circuit unit 20 receives the second d2a signal 102, the line electrode driver signal 202 outputted by the driver circuit unit 20 is the second line electrode half period 202*b*.

As shown in FIGS. 6E and 6F, the handwriting line electrode header setting data 121 of the scan signal 12 includes the first line electrode voltage data 1211 and the second line electrode voltage data 1212. When the handwriting line electrode waveform data 122 of the scan signal 12 is the first digital value, such as digital "1", the first line electrode half period 202*a* of the line electrode driver signal 202 is generated according to the first line electrode voltage data 1211 of the handwriting line electrode header setting data 121 by the driver circuit unit 20. In the embodiment, when the line electrode driver signal 202 outputted by the driver circuit unit 20 is the first line electrode half period 202*a*, a voltage value of the line electrode driver signal 202 generated by the driver circuit unit 20 is the fifth voltage V5 configured in the first line electrode voltage data 1211.

When the handwriting line electrode waveform data 122 of the scan signal 12 is the first digital value, such as digital "1", the second line electrode half period 202*b* of the line electrode driver signal 202 is generated according to the second line electrode voltage data 1212 of the handwriting line electrode header setting data 121 by the driver circuit unit 20. In the embodiment, when the line electrode driver signal 202 outputted by the driver circuit unit 20 is the second line electrode half period 202*b*, the voltage value of the line electrode driver signal 202 generated by the driver circuit unit 20 is the second voltage V2 configured in the second line electrode voltage data 1212.

In the embodiment, with reference to FIGS. 6B, 6C, and 6E, the d2a control port of the timing controller circuit unit 10 may output the d2a signal 102 to the driver circuit unit 20 during a pixel electrode blank data interval, or during a line electrode blank data interval. For example, the pixel electrode blank data interval is a time interval when the data signal 11 outputted by the data output ports is the pixel electrode blank time data 113, and the line electrode blank data interval is another time interval when the scan signal 12 outputted by the scan output ports is the line electrode blank time data 123.

The d2a signal 102 outputted by the d2a control port of the multistable display with the handwriting function port of the present invention is utilized for determining that the pixel electrode driver signal 201 is the first pixel electrode half period 201*a* or the second pixel electrode half period 201*b*. Therefore, the data output ports only need to finish transporting the waveform data before the first d2a signal 102 arrives with a rising voltage. As a result, once the waveform data is outputted, the data output ports no longer need to output more waveform data. In other words, for a time duration of the d2a control port outputting the d2a signal 102, the data output ports no longer need to output more waveform data. For example, with reference to FIGS. 6B and 6C, for a time duration of the d2a control port outputting the d2a signal 102, the data output ports output the pixel electrode blank time data 113. The pixel electrode blank time data 113 means that the data output ports do not output data. Therefore, when the d2a control port outputs the d2a signal 102, the data output ports no longer need to output more waveform data.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multistable display with a handwriting function, comprising:

a timing controller circuit unit, generating a timing controller signal;

a driver circuit unit, connected to the timing controller circuit unit, and receiving the timing controller signal; and a display panel unit, connected to the driver circuit unit;

wherein the timing controller signal comprises a digital to analog (d2a) signal, a data signal, and a scan signal; wherein the data signal comprises a handwriting pixel electrode header setting data and a handwriting pixel electrode waveform data; wherein the scan signal comprises a handwriting line electrode header setting data and a handwriting line electrode waveform data;

wherein when the driver circuit unit receives the d2a signal, the driver circuit unit generates at least one pixel electrode driver signal outputted to the display panel unit according to the handwriting pixel electrode header setting data and the handwriting pixel electrode waveform data, and the driver circuit unit generates at least one line electrode driver signal outputted to the display panel unit according to the handwriting line electrode header setting data and the handwriting line electrode waveform data.

2. The multistable display as claimed in claim 1, wherein the handwriting pixel electrode waveform data of the data signal is a 1-bit binary code, and the handwriting line electrode waveform data of the scan signal is a 1-bit binary code.

3. The multistable display as claimed in claim 2, wherein the pixel electrode driver signal comprises a first pixel electrode half period and a second pixel electrode half period;

wherein when the driver circuit unit receives a first d2a signal, the at least one pixel electrode driver signal outputted by the driver circuit unit is the first pixel electrode half period;

wherein when the driver circuit unit receives a second d2a signal, the at least one pixel electrode driver signal outputted by the driver circuit unit is the second pixel electrode half period.

4. The multistable display as claimed in claim 3, wherein the handwriting pixel electrode header setting data of the data signal comprises a first pixel electrode voltage data and a second pixel electrode voltage data;

wherein when the handwriting pixel waveform data of the data signal is a first digital value, the first pixel electrode half period of the pixel electrode driver signal is generated according to the first pixel electrode voltage data of the handwriting pixel electrode header setting data by the driver circuit unit;

wherein when the handwriting pixel waveform data of the data signal is the first digital value, the second pixel electrode half period of the pixel electrode driver signal is generated according to the second pixel electrode voltage data of the handwriting pixel electrode header setting data by the driver circuit unit.

5. The multistable display as claimed in claim 2, wherein the line electrode driver signal comprises a first line electrode half period and a second line electrode half period;

wherein when the driver circuit unit receives a first d2a signal, the at least one line electrode driver signal outputted by the driver circuit unit is the first line electrode half period;

wherein when the driver circuit unit receives a second d2a signal, the at least one line electrode driver signal outputted by the driver circuit unit is the second line electrode half period.

6. The multistable display as claimed in claim 5, wherein the handwriting line electrode header setting data of the data signal comprises a first line electrode voltage data and a second line electrode voltage data;

wherein when the handwriting line waveform data of the data signal is a first digital value, the first line electrode half period of the line electrode driver signal is generated according to the first line electrode voltage data of the handwriting line electrode header setting data by the driver circuit unit;

wherein when the handwriting line waveform data of the data signal is the first digital value, the second line electrode half period of the line electrode driver signal is generated according to the second line electrode voltage data of the handwriting line electrode header setting data by the driver circuit unit.

7. The multistable display as claimed in claim 1, wherein the timing controller circuit unit comprises:

a header setting control port, connected to the driver circuit unit, and outputting a header setting signal to the driver circuit unit;

a plurality of data output ports, connected to the driver circuit unit, and outputting the data signal to the driver circuit unit;

wherein when the data signal outputted by the data output ports is the handwriting pixel electrode header setting data, the header setting sign outputted by the header setting control port is at a high voltage.

8. The multistable display as claimed in claim 1, wherein the timing controller circuit unit comprises:

a d2a control port, connected to the driver circuit unit, and outputting the d2a signal to the driver circuit unit.

9. The multistable display as claimed in claim 1, wherein the data signal further comprises a pixel electrode blank time data, and the pixel electrode blank time data is configured after the handwriting pixel electrode waveform data;

wherein the scan signal further comprises a line electrode blank time data, and the line electrode blank time data is configured after the handwriting line electrode waveform data.

10. The multistable display as claimed in claim 9, wherein the d2a control port outputs the d2a signal to the driver circuit unit during a pixel electrode blank data interval for outputting the pixel electrode blank time data.

* * * * *